Sept. 28, 1948. E. B. OGAN 2,450,379
TAIL SET HARNESS

Filed April 23, 1948 3 Sheets-Sheet 1

ELMER B. OGAN,
Inventor.

By [signature]
Attorney

Sept. 28, 1948.   E. B. OGAN   2,450,379
TAIL SET HARNESS

Filed April 23, 1948   3 Sheets-Sheet 2

ELMER B. OGAN,
Inventor.

By Paul S. Eaton
Attorney

Sept. 28, 1948.  E. B. OGAN  2,450,379
TAIL SET HARNESS

Filed April 23, 1948  3 Sheets-Sheet 3

ELMER B. OGAN,
Inventor.

By
Attorney

Patented Sept. 28, 1948

2,450,379

UNITED STATES PATENT OFFICE 2,450,379

TAIL SET HARNESS

Elmer B. Ogan, Charlotte, N. C.

Application April 23, 1948, Serial No. 22,838

4 Claims. (Cl. 54—1)

1

This invention relates to harnesses for horses and more especially to an improved tail set harness.

A tail set harness embodies a plurality of strap members, usually of leather, which are interconnected and are also connected to a rigid member or tail set which is adapted to rest against the rump of the horse and to hold the stump of the tail of the horse in a substantially vertical position for a distance of approximately eight inches from the rump of the horse.

A tail set harness is only used for show horses and is generally worn by the horse only when the horse is stabled. The purpose of the same is to cause the ligaments, muscles, etc., near the base of the tail of the horse to remain flexed upwardly after the tail set harness has been removed for a substantial length of time, so as to greatly enhance the appearance of the horse.

Heretofore, the straps to which the rigid member or tail set have been connected have been secured at their other ends to a broad strap which is termed a surcingle or girth and extends over the back of the horse and downwardly around each side of the horse and beneath the belly of the horse where it has been necessary to draw the surcingle very tightly so that the rigid member would not slip rearwardly of the horse. This surcingle or girth has heretofore also had another strap member secured to the same which extended around the breast of the horse.

It is an object of this invention to eliminate the girth and thereby not only relieve the pressure on the mid-section of the horse, but to also decrease the weight of the tail set harness considerably.

Some of the objects of the invention having been stated, other objects will appear as the description proceeds, when taken in connection with the accompanying drawings, in which Figure 1 is a side elevation of the improved tail set harness;

Figure 1:
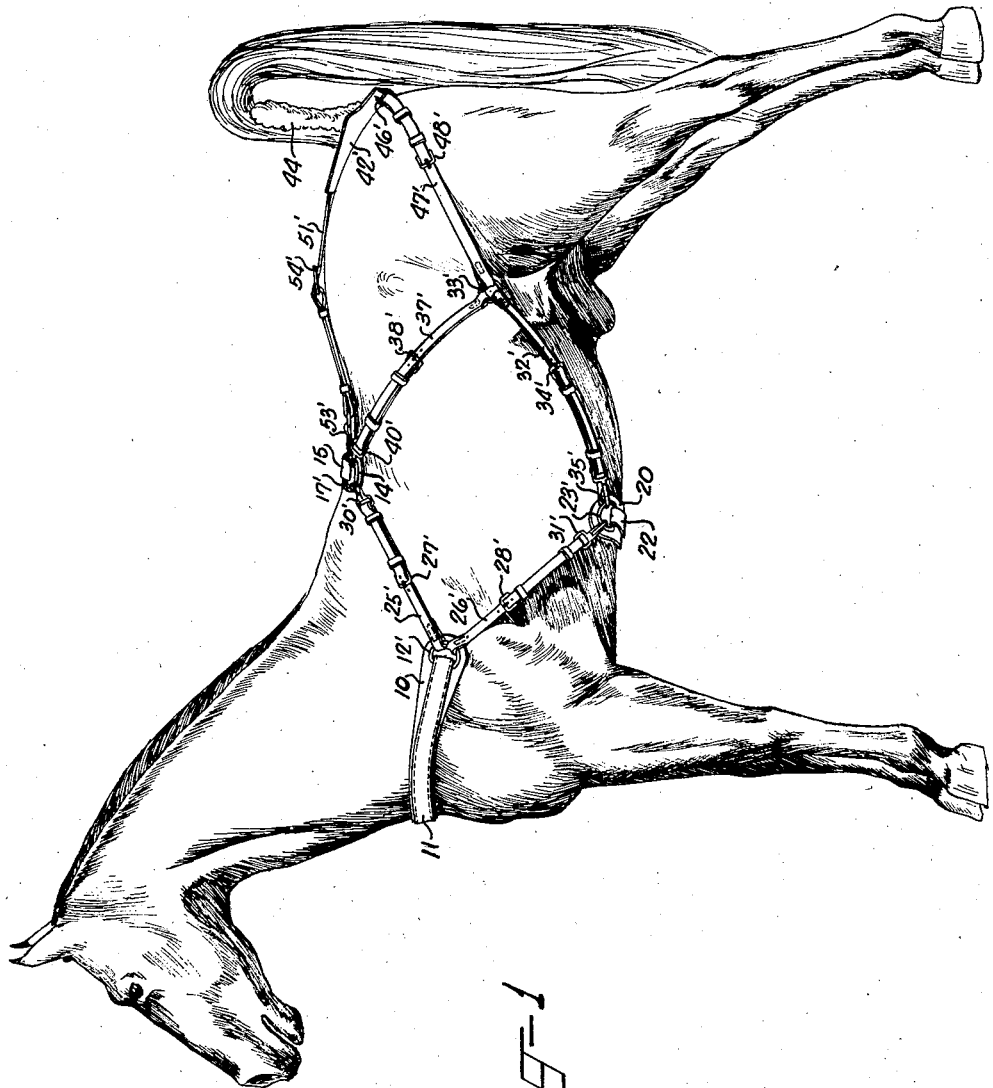
Figure 2:
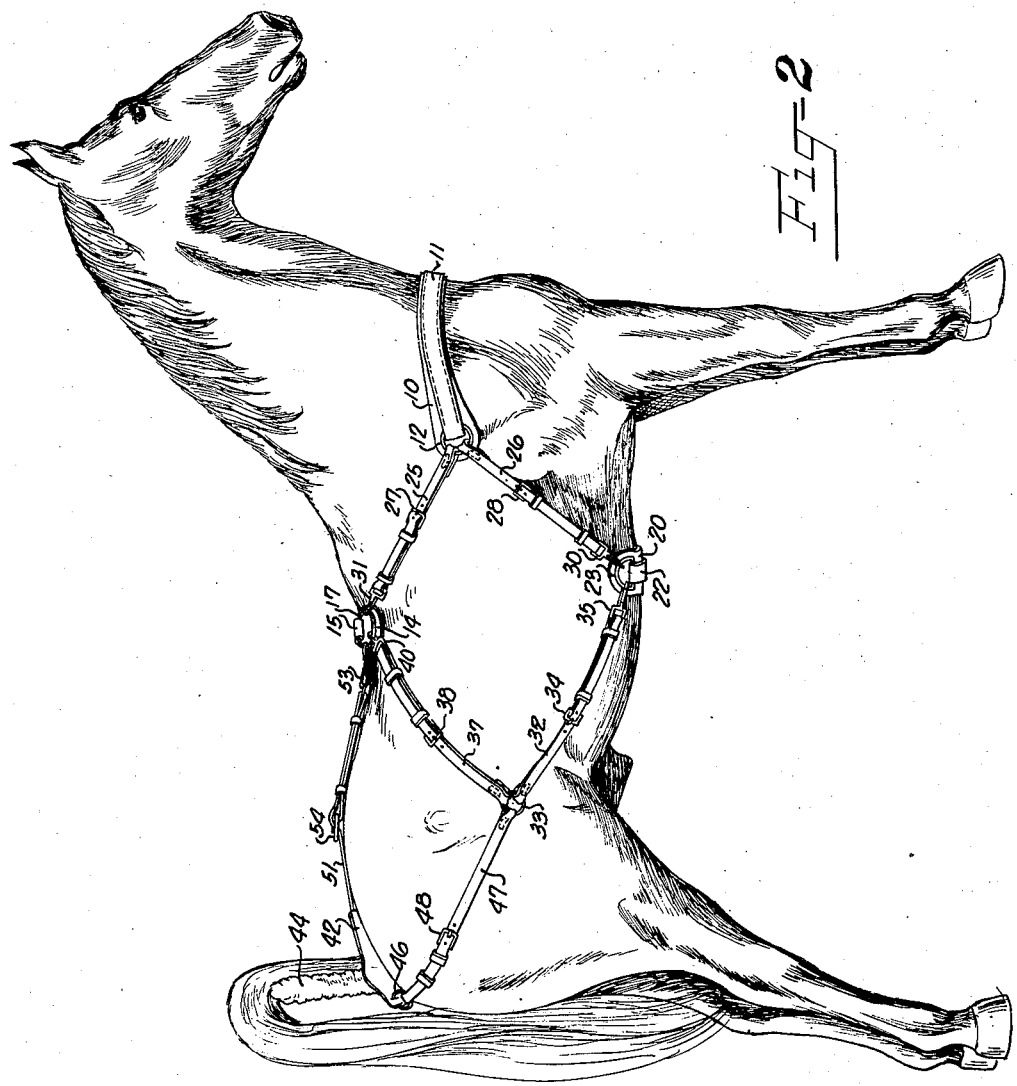
Figure 2 is an elevation of the other side of the harness from that shown in Figure 1.
Figure 3:
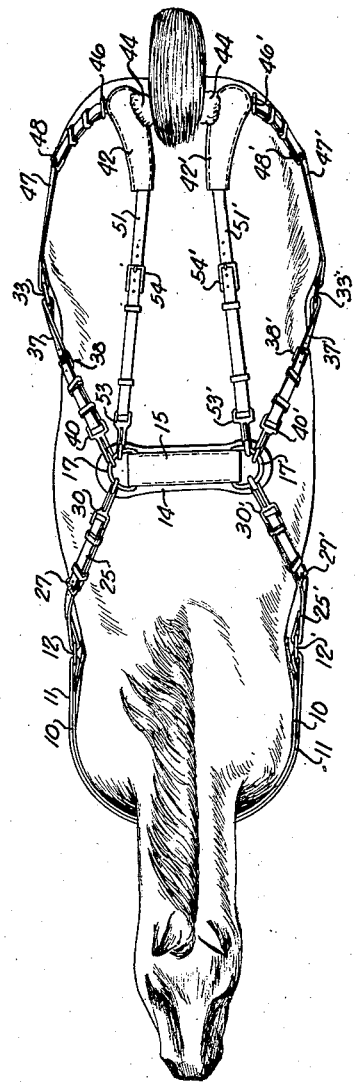
Figure 3 is a top plan view of the tail set harness.

Referring more specifically to the drawings, the numeral 10 indicates a breast strap which has stitched to the exterior thereof a strap 11 whose ends are turned inwardly against the strap 10 and lines of stitches pass through the inturned ends to secure the strap 11 and its inturned ends to the strap 10. Prior to turning inwardly the ends of the strap 11, suitable rings 12 and 12'

2 are placed in position to be confined at the ends of the strap 11.

Adapted to be mounted on the back of a horse is a pad member 14 which has stitched to the top thereof a leather strap 15 whose ends are turned inwardly and a line of stitches secures the inturned ends and the strap 15 to the back pad member 14 and also this confines suitable rings 17 and 17' at the ends thereof. Also, a belly pad 20 is provided which is identical in structure to the back pad 14 except that the belly pad is of slightly longer length than the back pad 14. This belly pad 20 has stitched to the exterior thereof a leather or canvas strap 22 which is turned at its ends backwardly beneath the belly pad 20 and the strap 22 and then the strap 22, with its inturned ends, is fixed to the belly pad 20 to confine rings 23 and 23' in its end portions.

As opposed sides of the harness are identical, the reference characters without the prime notation will be shown on the right-hand side of the harness and like reference characters will apply to the left hand side of the harness with the prime notation added.

Secured to rings 12 and 12' are strap members 25, 26, and 25' and 26', respectively, which extend rearwardly in diverging relation and are doubled upon themselves. The other end of the straps 25 and 26 have buckles 27 and 28, respectively, adapted to be adjusted in suitable holes in the straps 25 and 26 to adjust the overall length of the same. The rear ends of the straps 25 and 26 have secured thereto suitable hook members 30 and 31 which are adapted to be hooked into the rings 23 and 17.

Straps 32 and 32' have their rear ends doubled around and secured to rings 33 and 33' and the front ends thereof are doubled upon themselves and have buckles 34 and 34' respectively adapted to engage suitable holes in the straps 32 and 32' for adjusting the overall length of the same.

The forward end of the strap 32 has a snap hook 35 therein adapted to be snapped into the ring 23. Also secured to the ring 33 is one end of a strap 37 which is doubled upon itself at its other end and has a buckle 38 on its free end adapted to be adjusted in any one of several holes in the strap 37 for adjusting the overall length of the same. The doubled end portion of the strap 37 has confined therein a snap hook member 40 adapted to be snapped into the ring 17.

The specific means shown for supporting the tail of a horse in substantially upright position is not a part of my invention, and my invention relates to harness means for properly supporting the tail elevating means in position. This tail elevating means comprises side members 42 and 42' joined together by a cross portion which has rising upwardly therefrom a substantially upright portion 44 which is padded and suitably grooved for accommodating the stump or bony portion of a horse's tail. The side portions 42 and 42' have suitable rings 46 and 46' therein. The straps 47 and 47' are doubled around and secured to the rings 33 and 33' and extend rearwardly and upwardly and having their other ends passed through the rings 46 and 46' and with buckles 48 and 48' being disposed on the free ends thereof so that the overall length of the straps 47 and 47' can be adjusted by adjusting the buckles in any one of a number of holes in the straps 47 and 47'.

Fixedly secured to the portions 42 and 42' of the tail suporting means are straps 51 and 51' which extend forwardly and have their other ends looped through snap hooks 53 and 53' and the free end of the straps 51 and 51' have buckles 54 and 54' thereon which are adapted to be adjusted into any one of several holes in the straps 51 and 51' to regulate the overall length thereof.

It is thus seen that the straps 25 and 26 and 25' and 26' can be adjusted as to overall length to cause the back pad 17 and the belly pad 29 to occupy the correct position to fit any individual horse. Also, the straps 51 and 51' can be adjusted as to overall length to cause the back pad 17 to be disposed at the proper spot on the back of the horse. The overall length of the straps 32 and 32' and 47 and 47' can be adjusted to cause the proper amount of downward and forward stress to be exerted on the rear portion of the tail supporting means to hold it snugly on the rump of the horse and straps 37 and 37' can be adjusted as to overall length to cause the proper supporting of the central portion of the combined straps 32 and 32' and 47 and 47'.

It is thus seen that by proper adjustment of the various straps that the main portion of the pressure applied to the root or stump portion of the tail will be borne by the breast strap 10, where it should be borne, as this is the pulling point of a horse and by nature this is the proper place to place any load. Thus, the placing of a very tightly drawn girth or surcingle around the medial portion of the horse where the saddle girth is usually disposed is eliminated and gives freedom of movement to the horse and does not bind the midriff portion of the horse whatever at all and is not only much cooler, but is a great improvement in that it prevents the formation of a depression around the medial portion of the horse by wearing a band which is entirely too taut for comfort in a training operation.

In the drawings and specification there has been set forth a preferred embodiment of the invention, and although specific terms are employed, they are used in a generic and descriptive sense only, and not for purposes of limitation, the scope of the invention being defined in the claims.

I claim:

1. Apparatus for supporting a tail elevating device on a horse, said tail elevating device comprising a forked member adapted to rest on the rump of the horse and having an upright portion adapted to fit against the rear surface of the stump of the tail of the horse to support it in elevated position, means for holding the tail elevating device in position on the horse comprising a back pad and a belly pad and a breast pad, a pair of straps connected to the tail elevating device and to the back pad, side straps connected to the rear portion of the tail elevating device on each side thereof and extending forwardly and downwardly and having their forward ends connected to the belly pad, transverse straps connected to the back pad at one end and to a medial portion of the side straps at their other ends on each side of the horse, a pair of straps having one of their ends secured to the belly pad and the back pad respectively and having their forward ends secured to the ends of the breast pad on each side thereof, all of the said straps being adjustable as to overall length to thereby cause a major portion of the force required to hold the tail elevating device in position to be borne by the breast strap.

2. A harness for supporting a tail elevating device on a horse, said tail elevating device comprising a forked member whose open end is disposed forwardly towards the head of the horse and being adapted to rest on the rump of the horse and having a medially disposed upright portion adapted to fit against the back surface of an elevated stump of the tail of the horse, said harness comprising a back pad, and a belly pad, means connecting the back pad to the front end of the tail elevating device, means connecting the rear end of the tail elevating device on each side thereof to the respective ends of the belly pad, a breast strap, means connecting the ends of the back pad and the belly pad respectively to the respective ends of the breast strap, all of said means being adjustable as to overall length to exert forward force on the tail elevating device, the major portion of said force being borne by the breast strap.

3. In a structure according to claim 2, means connecting an intermediate portion of each of the means connecting the rear end of the tail elevating device to the belly pad to the back pad.

4. Harness for a tail elevating device on a horse, said tail elevating device comprising a member adapted to rest on the rump of the horse and on each side of the tail of the horse and having an upright portion against which the stump of the tail of the horse is adapted to rest, the harness mechanism comprising a breast strap, a back strap and a belly strap, means connecting the two ends of the back strap and the belly strap to the two ends of the breast strap on each side of the horse, means connecting the two ends of the belly strap to the rear end of the tail elevating device on each side of the horse, means connecting the back strap with the forward end of the tail elevating device, and means connecting each end of the back strap to an intermediate portion of the means connecting the rear portion of the tail elevating device to the belly strap.

ELMER B. OGAN.

No references cited.